US009440215B2

(12) United States Patent
Chyou et al.

(10) Patent No.: US 9,440,215 B2
(45) Date of Patent: Sep. 13, 2016

(54) MEMBRANE REACTION APPARATUS FOR RECOVERING HEAT OF REACTION (71) Applicant: ATOMIC ENERGY COUNCIL-INSTITUTE OF NUCLEAR ENERGY RESEARCH, Taoyuan County (TW)

(72) Inventors: Yau-Pin Chyou, Taoyuan County (TW); Yen-Cho Chen, Taoyuan County (TW); Po-Chuang Chen, Taoyuan County (TW); Reiyu Chein, Taichung (TW); Wen-Jenn Sheu, Hsinchu (TW); Yu-Shao Lin, Hsinchu (TW)

(73) Assignee: Atomic Energy Council—Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 14/264,417

(22) Filed: Apr. 29, 2014

(65) Prior Publication Data

US 2015/0118118 A1    Apr. 30, 2015

(30) Foreign Application Priority Data

Oct. 30, 2013  (TW) .............................. 102139368 A (51) Int. Cl.
| | |
|---|---|
| B01J 19/24 | (2006.01) |
| B01J 8/00 | (2006.01) |
| B01J 15/00 | (2006.01) |
| B01J 8/02 | (2006.01) |

(52) U.S. Cl.
CPC ............. *B01J 19/2475* (2013.01); *B01J 8/009* (2013.01); *B01J 8/0221* (2013.01); *B01J 15/005* (2013.01); *B01J 19/2415* (2013.01); *B01J 2208/0053* (2013.01); *B01J 2208/00176* (2013.01); *B01J 2219/00006* (2013.01); *B01J 2219/2423* (2013.01); *B01J 2219/2475* (2013.01)

(58) Field of Classification Search
CPC ................. B01J 8/009; B01J 19/2475; B01J 2119/00907; B01J 2119/2423; B01J 2119/2475; B01J 2119/2411; B01J 2119/2416
See application file for complete search history.

(56) References Cited

U.S. PATENT DOCUMENTS

| | | | | |
|---|---|---|---|---|
| 4,769,297 | A * | 9/1988 | Reiser et al. ................. | 429/413 |
| 7,285,143 | B2 * | 10/2007 | Sato et al. ........................ | 48/76 |
| 2010/0008840 | A1 * | 1/2010 | Zhong et al. ................. | 423/247 |
| 2010/0104903 | A1 * | 4/2010 | Gummalla et al. ............. | 429/20 |

* cited by examiner

*Primary Examiner* — Lessanework Seifu
(74) *Attorney, Agent, or Firm* — Rosenberg, Klein & Lee (57) ABSTRACT

The present invention provides a membrane reaction apparatus for recovering heat of reaction, which includes a membrane reactor. The said membrane reactor includes a reaction pipeline, a membrane and a sweep pipeline. The reaction pipeline has a reaction space, and an exothermic reaction occurs therein, which generates product gas and heat of reaction. Part of the product gas penetrates through the membrane around the reaction space and enters into the sweep pipeline. Sweeping gas enters into the sweep pipeline and carries the product gas and the heat of reaction away. It is feasible to wrap the product gas around the sweep pipeline, for enhancing the heat transfer from the product gas to the sweeping gas. The heat of reaction brought by the sweeping gas can be further released in a heat exchanger, so that the heat of reaction is available to be recovered and used for other endothermic processes.

8 Claims, 5 Drawing Sheets

MEMBRANE REACTION APPARATUS FOR RECOVERING HEAT OF REACTION

FIELD OF THE INVENTION

The present invention relates to a membrane reaction apparatus, in particular to a membrane reaction apparatus for recovering heat of reaction by using sweeping gas to carry product gas and heat of reaction away, which are involved in other reactions or endothermic processes.

DESCRIPTION OF RELATED ART

A membrane reactor used in chemical reactions generally combines technologies of catalysis and membrane separation in order to improve efficiency itself, and then provides both functions of catalysis and product separation. Compared with a conventional reactor, a membrane reactor achieves higher productivity and purity of products.

The membrane reactor has the following characteristics:
I. products can be removed by selective diffusion or adsorption of the membrane, according to the Le Chatelier's principle, chemical equilibrium will therefore be shifted toward the product side to improve the conversion rate of the reaction (e.g. $N_2+3H_2 \rightarrow 2NH_3$, $CO+H_2O \rightarrow CO_2+H_2$), especially of which the equilibrium limitation in a conventional reactor can be surpassed;
II. because the products leaves the reaction system rapidly, side reactions and byproducts can be avoided and the selectivity of reactions can be improved;
III. the products are selectively removed by the membrane to enhance the purity, and concentrated to increase the concentration;
IV. operations of chemical reactions and product separation can be proceeded in the same membrane reactor, so that the processes are simplified, thereby costs and working spaces are reduced;
V. the catalysts in the membrane reactor can improve the conversion rate and facilitate the onset of chemical reactions, thereby lowering the reaction temperature or the reaction pressure, to improve the selectivity and decrease energy consumption.

A catalytic reactor for water-gas shift reaction, combined with membranes for providing selective permeability or adsorption of hydrogen, can be used as a membrane reactor for catalysis of water-gas shift reaction that is suitable for production of high-purity hydrogen. Besides being used as raw material of other chemical reactions, hydrogen fuel gets more attentions as a clean and sustainable energy. Thus, the advanced technology that uses a membrane reactor for catalyzing water-gas shift reactions to obtain hydrogen is of great importance to the development of hydrogen fuel cells. However, nitrogen is mostly used in prior art as sweeping gas to take away the hydrogen passing through the hydrogen-selective permeable/adsorptive membrane, so that the separation of hydrogen and nitrogen becomes more complicated, and the purity of hydrogen cannot be easily increased. Additionally, water-gas shift reaction is an exothermic reaction, while a large accumulation of heat generated in the reaction can cause damage to the hydrogen-selective permeable/adsorptive membrane and the catalysts used for water-gas shift reaction; hence, improvement of such reactors is necessary.

Accordingly, the present invention provides a means of using gas with higher condensation temperature as sweeping gas, which can thus be separated from the product gas through condensation. The solubility of the product gas in the condensed liquid should be considered for the choice of sweeping gas. Additionally, sweeping as with higher specific heat capacity can be chosen to carry more heat and homogenize the temperature distribution, so that it can improve the efficiency of the reaction and extend the lifetime of the membranes. In the meantime, more heat generated in the reaction can be recovered for further utilization, and thus saves the energy consumption of the whole system.

Therefore, the membrane reaction apparatus for recovering heat of reaction in the present invention comprises a membrane reactor with a sweep pipeline, so that the sweeping gas can flow into the sweep pipeline and carry away the product gas formed by an exothermic reaction. Furthermore, the membrane reactor can be combined with a heat exchanging device or the like, whereby the heat accumulated by the membranes is transported by the sweeping gas with product gas to other parts of the membrane with lower temperature, making the temperature homogenized or involving the recovered heat into other endothermic processes.

In the present invention, a substance capable of being condensed and vaporized repeatedly is used as sweeping gas in the temperature range for various components of the whole device. The sweeping gas is available for recycling usage with further consideration to the properties like specific heat capacity and solubility of the generated substance, whereby the purity of the product gas, the recovered heat of reaction and the protection of the membrane reactor can be improved.

SUMMARY OF THE INVENTION

Accordingly, it is a primary object of the present invention to provide a membrane reaction apparatus for recovering heat of reaction. The membrane reaction apparatus uses sweeping gas to carry away the product gas passing through the membrane, and the heat energy released from an exothermic reaction in the reaction space and accumulated in the membrane, so that it is available to prevent overheating the membrane, improve the temperature distribution on the membrane, enhance the reactor performance, and increase the lifetime of the membrane.

The secondary object of the present invention is to provide a membrane reaction apparatus for recovering heat of reaction used for separating the sweeping gas and the product gas by cooling and condensing the sweeping gas to form liquid, so that the product gas with higher purity can be obtained. The condensed liquid can be reheated again to from the sweeping gas, thus is available for regeneration.

The third object of the present invention is to provide a membrane reaction apparatus for recovering heat of reaction, which releases the heat of reaction carried by the sweeping gas through condensation process, thus it is available to transfer the heat of reaction into other endothermic processes via heat exchange.

To achieve the objects of the present invention, a membrane reaction apparatus for recovering heat of reaction is provided. The membrane reaction apparatus includes a membrane reactor, which comprises a reaction pipeline with a reaction space therein, a membrane installed in the outer of the reaction space and a sweep pipeline installed in the outer of the membrane. The reaction space can further comprise a catalyst layer.

An exothermic reaction occurs in the reaction space and generates product gas and heat of reaction. The catalyst layer catalyses the exothermic reaction. The product gas selectively passes through the membrane and enters into the sweep pipeline. The heat of reaction can be transferred through the membrane to enter the sweep pipeline. A sweeping gas enters the sweep pipeline to carry away the product gas and the heat of reaction. By contacting the membrane with the sweeping gas, the part of the membrane with higher temperature is cooled while that with lower temperature is heated, and thus the temperature distribution on the membrane is improved.

The sweeping gas and the product gas can be incorporated into follow-up reactions or processes directly or separated from each other. Selecting the sweeping gas with higher condensation temperature is capable of separating the product gas from the sweeping gas by condensing the latter to form liquid.

Therefore, the present invention can further comprise: a heat exchanger including a heat-discharging pipeline connected with the outlet of the sweep pipeline and a heat-charging pipeline contacting with the heat-discharging pipeline; and a liquid tank connected with the outlet of the heat-discharging pipeline.

After the sweeping gas carrying the product gas enters the heat-discharging pipeline, the sweeping gas can release the heat of reaction carried along. The sweeping gas and the product gas release heat gradually and flow toward the liquid tank. The sweeping gas is condensed to form liquid in the processes and separated from the product gas, thus the product gas can be collected easily. The condensed liquid in the liquid tank can be vaporized again to regenerate as the sweeping gas and recycled to the system. The heat of reaction released in the heat-discharging pipeline can heat substance in the heat-charging pipeline, thus is available to recover the heat of reaction generated from the exothermic reaction and involve the heat of reaction into other endothermic processes. For example, the recovered heat of reaction can be used in a heater which heats the condensed liquid to form the sweeping gas, thus lower the heat energy consumption of the heater. In the meantime, the present invention can improve the temperature distribution on the membrane, enhance the performance of the reactor and increase the lifetime of catalyst and the membrane.

DETAILED DESCRIPTION OF THE PREFERRED EMBODIMENTS

The technical contents of the present invention will become apparent with the detailed description of preferred embodiments and the illustration of related drawings as follows.

A membrane reaction apparatus for recovering heat of reaction of the present invention exhibits the following characteristics:

I. The product gas flowing into the sweep pipeline and the heat transferring through the membrane are carried away by the sweeping gas. Thus, the temperature distribution on the membrane is improved, and the heat of reaction and the product gas generated from the exothermic reaction are recovered for subsequent utilization.

II. In the process of cooling the sweeping gas and the product gas, the sweeping gas condenses into the liquid which is separated from the product gas, and the heat energy carried by the sweeping gas and the product gas is released, so that the heat energy can be involved in other endothermic processes.

Figure 1:
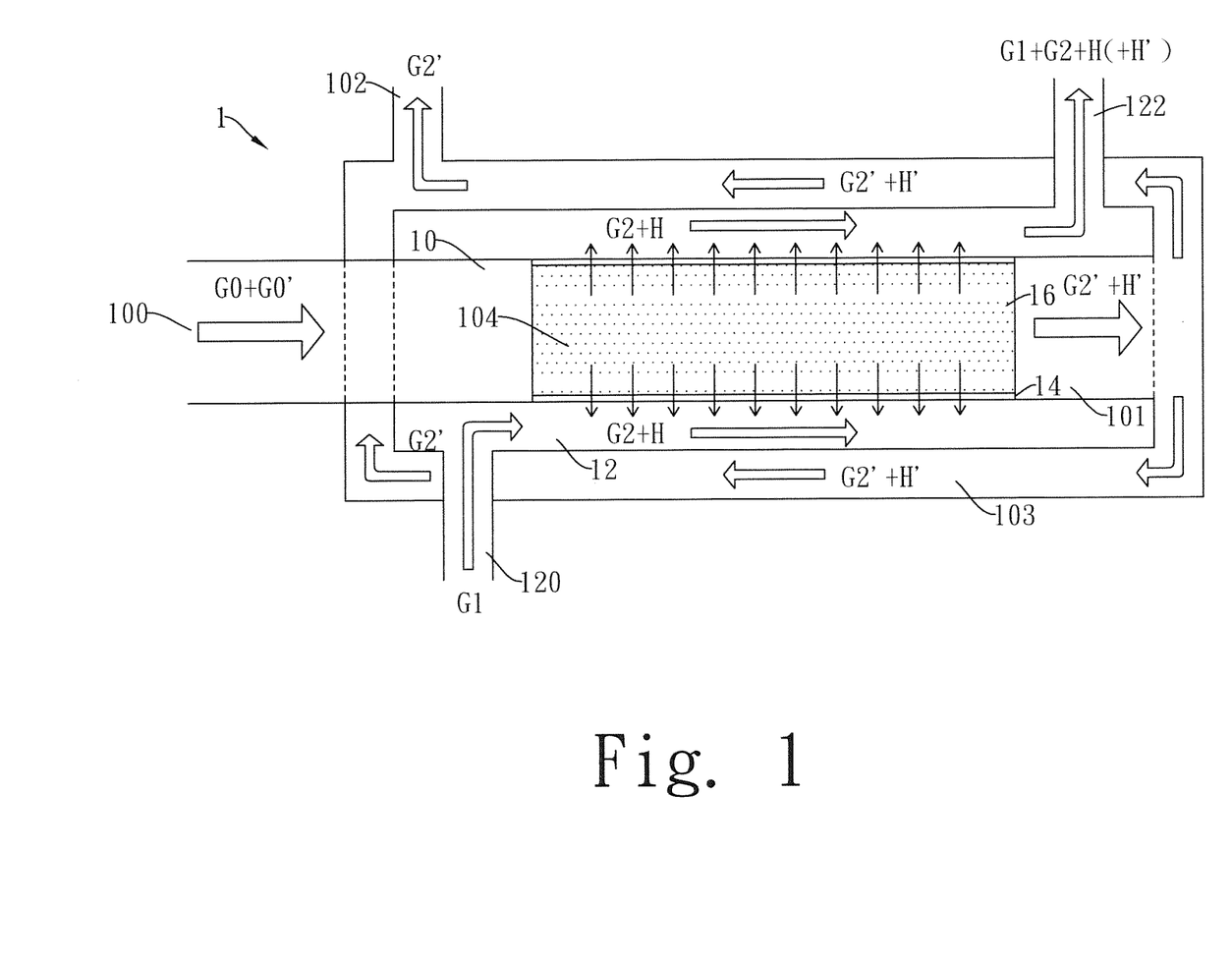
FIG. 1 is a sectional structural view of first embodiment of a membrane reactor of the present invention.

FIG. 1 is a sectional structural view of the first embodiment of a membrane reactor in a membrane reaction apparatus of the present invention. With referred to FIG. 1, the membrane reaction apparatus of the present invention comprises a membrane reactor 1. The membrane reactor 1 comprises a reaction pipeline 10, a membrane 14 and a sweep pipeline 12. The reaction pipeline 10 includes a reaction space 104. The membrane 14 is formed in the outer of the reaction space 104, and the two ends of the membrane 14 are connected with the reaction pipeline 100. The sweep pipeline 12 is installed in the outer of the membrane 14. In this embodiment, the reaction space 104 further comprises a catalyst layer 16 therein. (The catalyst layer 16 is marked with grid points in FIG. 1.)

A reaction gas inlet 100 is formed upstream the reaction pipeline 10, and a reaction gas outlet 102 is formed downstream the reaction pipeline 10. The reaction space 104 is formed between the reaction gas inlet 100 and the reaction gas outlet 102. A sweeping gas inlet 120 is further formed upstream the sweep pipeline 12, and a sweeping gas outlet 122 is formed downstream the sweep pipeline 12. Furthermore, the reaction pipeline 10 formed downstream the reaction space 104 is further extended and enclose the outer side of the sweep pipeline 12.

In the present invention, an exothermic reaction is occurred in the reaction space 104 of the membrane reactor 1, and generates product gas G2 and the heat of reaction H. In this embodiment, the exothermic reaction is a water-gas shift reaction:

CO+H$_2$O vapor→CO$_2$+H$_2$+the heat of reaction

Therefore, the product gas G2 is hydrogen gas, and the other product gas G2' is carbon dioxide. Furthermore, a reactant gas G0 is carbon monoxide in this embodiment and the other reactant gas G0' is water vapor (steam).

The catalyst layer 16 can be used in the exothermic reaction to catalyze the water-gas shift reaction, and the catalyst has pores thereon such as a ferrochrome catalyst, a CuZn catalyst, a CoMo catalyst, a Cu—Ce(La)O$_x$ catalyst, an Ni—Ce(La)O$_x$ catalyst, a Ru/ZrO$_2$ catalyst, an Au/CeO$_2$ catalyst, or a Cu—Pd/CeO$_2$ catalyst. At the same time, the membrane 14 can be selected to let the product gas G2 pass through the membrane 14 by selective diffusion or adsorption. For example, a palladium membrane can be selected because of its hydrogen-selective permeability or adsorption. Thus, the product gas G2 generated in the reaction space 104 passes through the membrane 14 and enters the sweep pipeline 12.

When the membrane reactor for recovering the heat of reaction of the present invention is in operation, CO and H$_2$O vapor used as reactant gas G0 and G0' pass through the reaction gas inlet 100, enter the reaction pipeline 10, contacts with the catalytic layer 16 in the reaction space 104 and generate H$_2$ and CO$_2$ as the product gas G2 and G2' in the water-gas shift reaction catalyzed by the catalytic layer 16. Furthermore, impurity gas G0" (not shown in the figures) might mix with the reactant gas G0 and G0' and enter the reaction pipeline 10. The impurity gas G0" might react with the reactant gas G0 or G0' or the product gas G2 or G2", thus generate other impurity gas G2" (not shown in the figures).

The product gas G2 (hydrogen) is available to be used as fuel. Therefore. the product gas G2, the product gas G2' (and the impurity gas G0" or G2") are needed to collected separately. Since hydrogen can selectively diffuse through the membrane 14, the product G2 is capable to pass the membrane 14 and enter the sweep pipeline 12. The efficiency of the water-gas shift reaction is limited by the concentration of the generated substances (the product gas G2 and G2'), so the phenomenon of the product gas G2 diffusing through the membrane 14 and escaping from the reaction space 104 is helpful to the yield of the product gas G2 in the water-gas shift reaction. If the product gas G2 entering the sweep pipeline 12 does not leave promptly, the concentration of the product gas G2 accumulated in the sweep pipeline 12 is increased, so that the diffusion rate of the product gas G2 through the membrane 14 into the sweep pipeline is affected. Accordingly, the produced gas is accumulated in the reaction space 104, and the reaction rate of the water-gas shift reaction is reduced. Therefore, this invention utilizes the sweeping gas G1 for carrying away the product gas G2, in order to avoid the product gas G2 accumulated in the sweep pipeline 12 and the reaction space 104, and reduce the reaction rate of the water-gas shift reaction.

An ideal sweeping gas should have property of easy separation from the product gas. While for recovering the heat of reaction H. the sweeping gas G1 with higher specific heat is preferred, which is capable to carry more heat of reaction H. Steam can be separated from the product gas G2 easily by condensing into water, and the $H_2O$ vapor is a substance with high specific heat in nature; hence, $H_2O$ vapor is selected as the ideal sweeping gas G1 of the present invention.

Steam used as the sweeping gas G1 enters the sweep pipeline 12 from the sweeping gas inlet 120 and carries away the product gas G2 diffused through the membrane 14. The $H_2O$ vapor as the sweeping gas G1 is capable to take up the heat of reaction H accumulated in the membrane 14 from the water-gas shift exothermic reaction, thus lowers the temperature in part of the membrane 14 with higher temperature and increases the temperature in part of the membrane 14 with lower temperature, whereby the $H_2O$ vapor provides a function for improving the temperature uniformity and the stability of the membrane 14, and avoids degradation of the membrane 14 or the catalytic layer at high temperature. Referring to the figures, the downstream part of the reaction pipeline 10 is extended and encloses the outer structure of the sweeping gas 12; hence, the $H_2O$ vapor as the sweeping gas G1 can further take up the residual heat H' carried by the product gas G2' (and the impurity gas G0" or G2"). The $H_2O$ vapor as the sweeping gas G1 carries the product gas G2, the heat of reaction H and the residual heat H' to leave the sweep pipeline 12 via the sweeping gas outlet 122.

The mixture of $H_2O$ vapor as the sweeping gas G1 and hydrogen as the product gas G2 is available to take part in other reactions. Alternatively, the hydrogen as the product gas G2 can be further separated from the $H_2O$ vapor as the sweeping gas G1, incorporated into other reactions, while the heat of reaction H (and the residual heat H') taken up by the sweeping gas G1 and the product gas G2 in the sweep pipeline 12, from the membrane 14 and the reaction pipeline 10, can be recovered.

Through the installation of each component in the embodiment, the membrane reactor for recovering the heat of reaction of the present invention catalyzes a process of an exothermic reaction by using a catalytic layer 16 of a membrane reactor 1, and then the product gas G2 which is generated in a reaction pipeline 10 diffuses into a sweep pipeline 12 through a membrane 14. The product gas G2 and the heat of reaction H (and the residue heat H') accumulated on the membrane 14 are removed by the sweeping gas G1. Thus, the reaction rate is kept in a high level and the temperature is uniformed to protect the membrane 14 and the catalytic layer 16. Alternatively, the sweeping gas inlet 120 and sweeping gas outlet 122 can be exchanged to configure the counter-flow layout, which can also accomplish the purposes of recovering the heat of reaction and improving the temperature distribution of the reaction environment.

Figure 2:
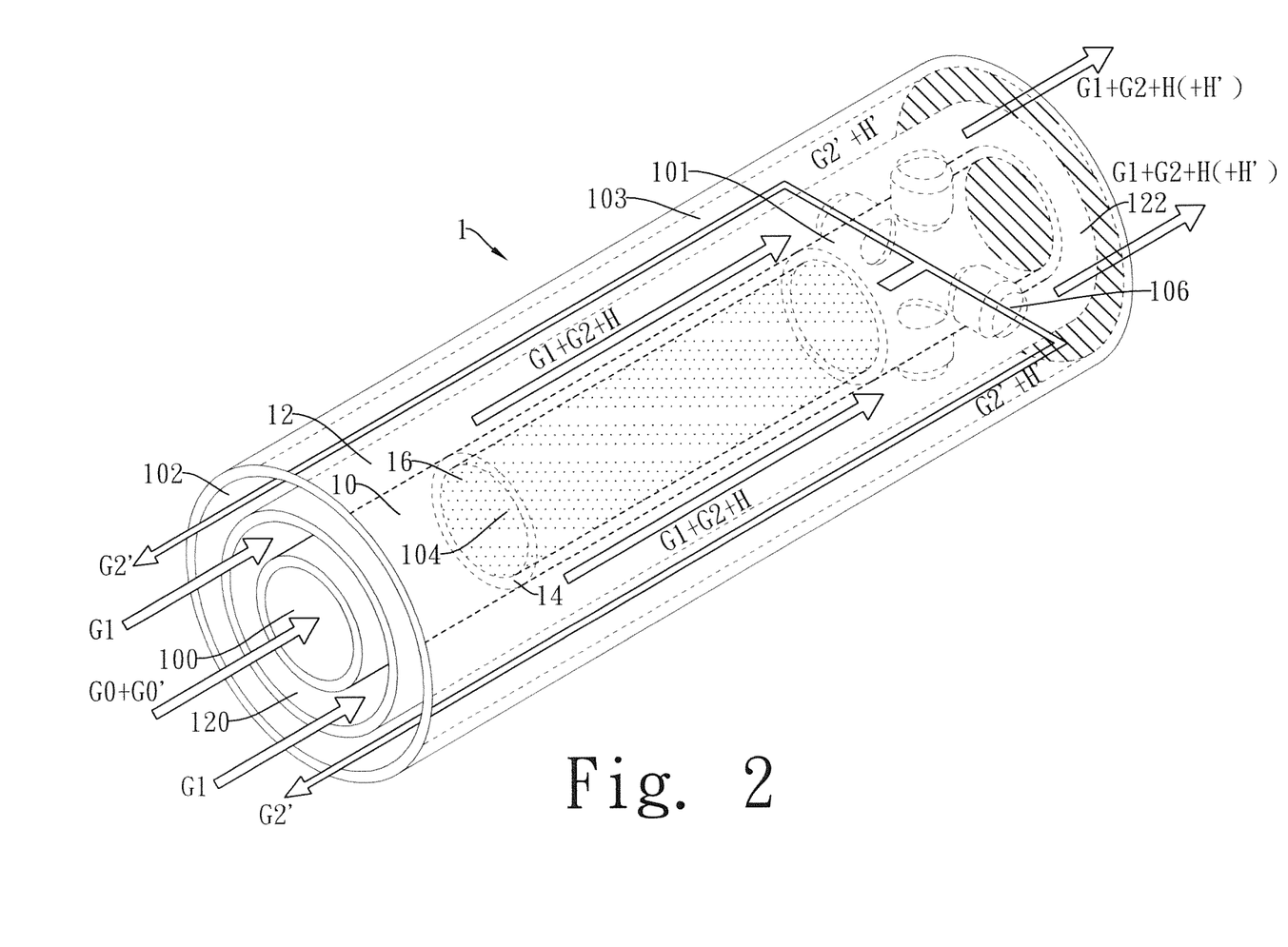
FIG. 2 is a perspective structural view of second embodiment of the membrane reactor of the present invention.

Referring to FIG. 1 and FIG. 2, which are a perspective structural view of the second embodiment of the membrane reactor of the present invention. As shown in FIG. 2. the membrane reactor for recovering the heat of reaction also comprises the membrane reactor 1, and the membrane reactor 1 also comprises the reaction pipeline 10, the catalytic layer 16 mounted in the reaction space 104 of the reaction pipeline 10 (shown in FIG. 2, marked by dots), the membrane 14 mounted at the outside of the reaction space 104 and the sweep pipeline 12 mounted at the outside of the membrane 14.

The technical feature of this embodiment is a concentric tube structure, comprising the reaction pipeline 10 (containing the reaction space 104, the tubular segment 101, and the annular segment 103), and the sweep pipeline 12. In the figures, the most interior tube structure is the tubular segment 101 of the reaction pipeline 10 with a reaction gas inlet 100. The annular structure outside the tubular segment 101 of the reaction pipeline 10 is the sweep pipeline 12, including a sweeping gas inlet 120 and a sweeping gas outlet 122. The outmost structure enclosing the sweep pipeline 12 is the annular segment 103 of the reaction pipeline 10 with a reaction gas outlet 102. Also, the tubular segment 101 of the reaction pipeline 10 and the annular segment 103 of the reaction pipeline 10 are closed respectively beside the sweeping gas outlet 122 (marked in the figure slash Department), and at least one connecting pipeline 106 is further installed to connect the tubular segment 101 of the reaction pipeline 10 and the annular segment 103 of the reaction pipeline 10, thus that the product gas G2' can surge from the tubular segment 101 of the reaction pipeline 10 to the annular segment 103 of the reaction pipeline 10, then flow in the counter-stream direction against the sweeping gas and leave via the reaction gas outlet 102.

As mentioned previously, the reaction gas G0 and G0' (or the impurity gas G0") enters the reaction space 104 from the reaction gas inlet 100, and gets into contact with the catalytic layer 16 in the reaction space 104, so that an exothermic reaction takes place and generates the product gas G2 and G2'(or the impurity gas G2"). The product gas G2 passes through the membrane 14 selectively and enters the sweep pipeline 12. The sweeping gas G1 enters from the sweeping gas inlet 120 into the sweep pipeline 12 and carries away the product gas G2, and the sweeping gas G1 transports the heat of reaction H and makes the temperature distribution on the membrane 14 more uniform. The product gas G2' (or the impurity gas G0" or G2") and the residual heat H' pass through the connecting pipeline 106 to the annular segment 103 of the reaction pipeline 10. The residual heat H' can be further transferred to the sweeping gas G1, and the product gas G2' (or the impurity gas G0" or G2") is discharged from the reaction gas outlet 102. On the other side, the sweeping gas G1 carries the product gas G2 and the heat of reaction H (and the residual heat H') to leave the sweep pipeline 12 from the sweeping gas outlet 122. Therefore, the mixture of the sweeping gas G1 and the product gas G2, the purified and separated product gas G2, the recycled sweeping gas G1 or the heat of reaction H (and the residual heat H') are available to be reused.

Figure 3:
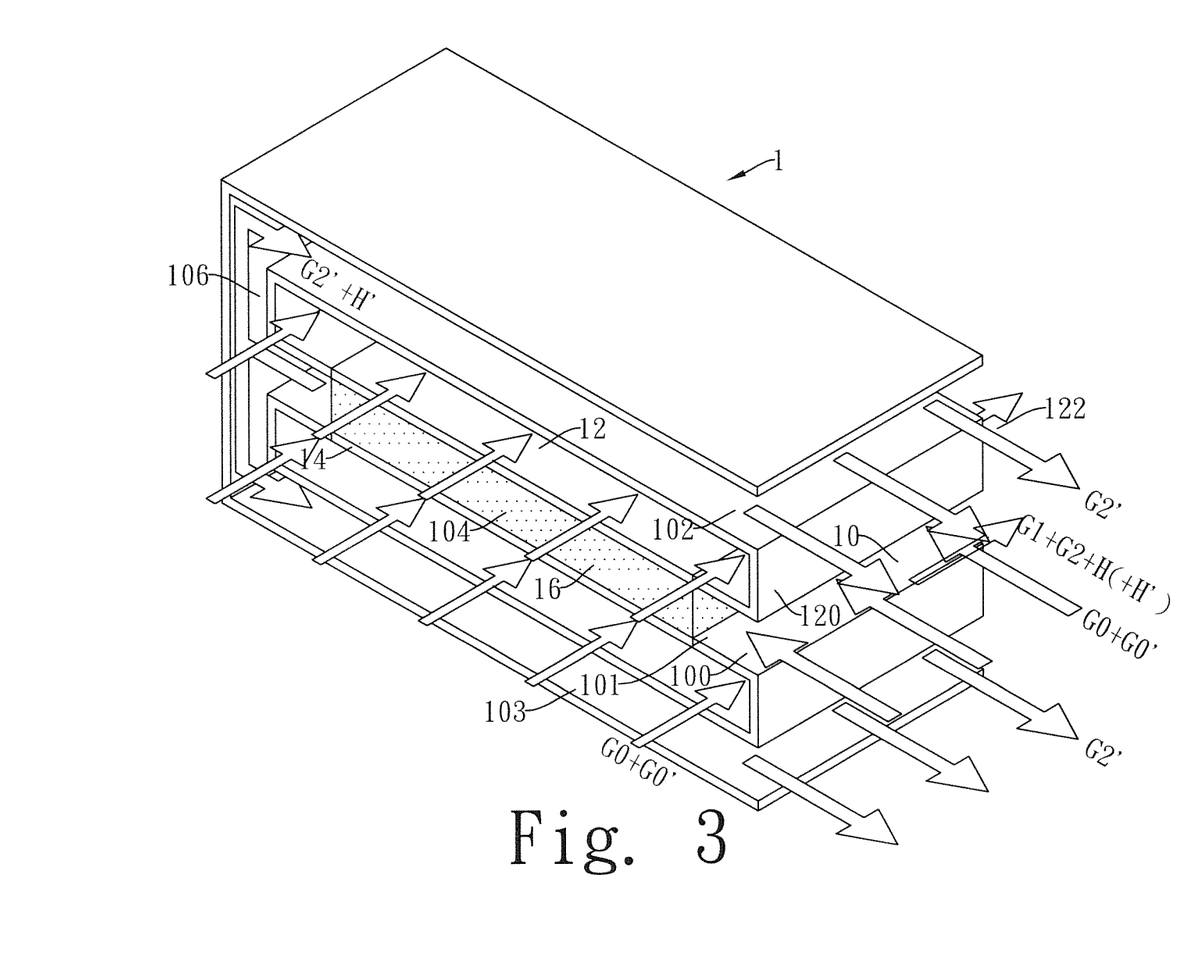
FIG. 3 is a perspective structural view of third embodiment of the membrane reactor of the present invention.

FIG. 3 is the perspective structural view of the third embodiment of the membrane reactor for recovering the heat of reaction of the present invention. Referring to FIG. 1 and FIG. 3, the membrane reactor for recovering the heat of reaction of this embodiment comprises the membrane reactor 1, and the membrane reactor 1 comprises the reaction pipeline 10, the catalytic layer 16 (marked with dots in the figures) formed between the reaction pipeline 10 and the reaction space 104, the membrane 14 formed outside the reaction space 104, and the sweep pipeline 12 formed outside the membrane 14.

The characteristic of this embodiment is the parallel plate structure of the reaction pipeline 10 (including the reaction space 104), and the sweep pipeline 12. Referring to the figures, the innermost plate structure is the front (upstream) segment 101 of the reaction pipeline 10, including a reaction gas inlet 100 and the reaction space 104. The plate structure located on the both sides of the front segment 101 of the reaction pipeline 10 is the sweep pipeline 12 with cross-flow orientation, which further comprises a sweeping gas inlet 120 and a sweeping gas outlet 122 in the upstream and downstream ends of the sweep pipeline 12, respectively. The plate structure of the reaction pipeline 10 further bifurcates and wraps around the both sides of the sweep pipeline 12 to form the rear (downstream) segment 103 of the reaction pipeline 10, including a reaction gas outlet 102. The front segment 101 and the rear segment 103 of the reaction pipeline 10 are further connected to each other by at least one connection pipeline 106.

As described above, the reaction gas G0 and G0' (or the impurity gas G0") enters the reaction space 104 from the reaction gas inlet 100, and an exothermic reaction occurs when the reaction gas G0 and G0' contacts with the catalytic layer 16 in the reaction space 104, and thus generates the product gas G2 and G2' (or the impurity gas G2"). The product gas G2 passes through the membrane 14 selectively and enters the sweep pipeline 12. The sweeping gas G1 enters the sweep pipeline 12 from the sweeping gas inlet 120 and carries away the product gas G2 and transports the heat of reaction H, and thus makes the temperature distribution on the membrane 14 more uniform. The product gas G2 (or the impurity gas G0" or G2") and the residual heat H' pass through the connection pipeline 106 and enter the rear segment 103 of the reaction pipeline 10, thus the residual heat H' can be transferred to the sweeping gas G1, whereby the product gas G2' (or the impurity gas G0" or G2") is discharged from the reaction pipeline 10 finally. The product gas G2 and the heat of reaction H (and the residual heat H') carried by the sweeping gas G1 leave the sweep pipeline 12 from the sweeping gas outlet 12. Thus, it is able to use the mixture of the sweeping gas G1 and the product gas G2 directly, purify the product gas 62, recycle the sweeping gas G1, or recover the heat of reaction H (and the residual heat H').

The flow direction of the sweeping gas G1 is in cross-stream orientation with the flow direction of the reactant gas G0 and G0' and the product gas G2 and G2', so that the flow direction of the sweeping gas G1 is undisturbed by the pipeline wall of the connection pipeline 106.

Figure 4:
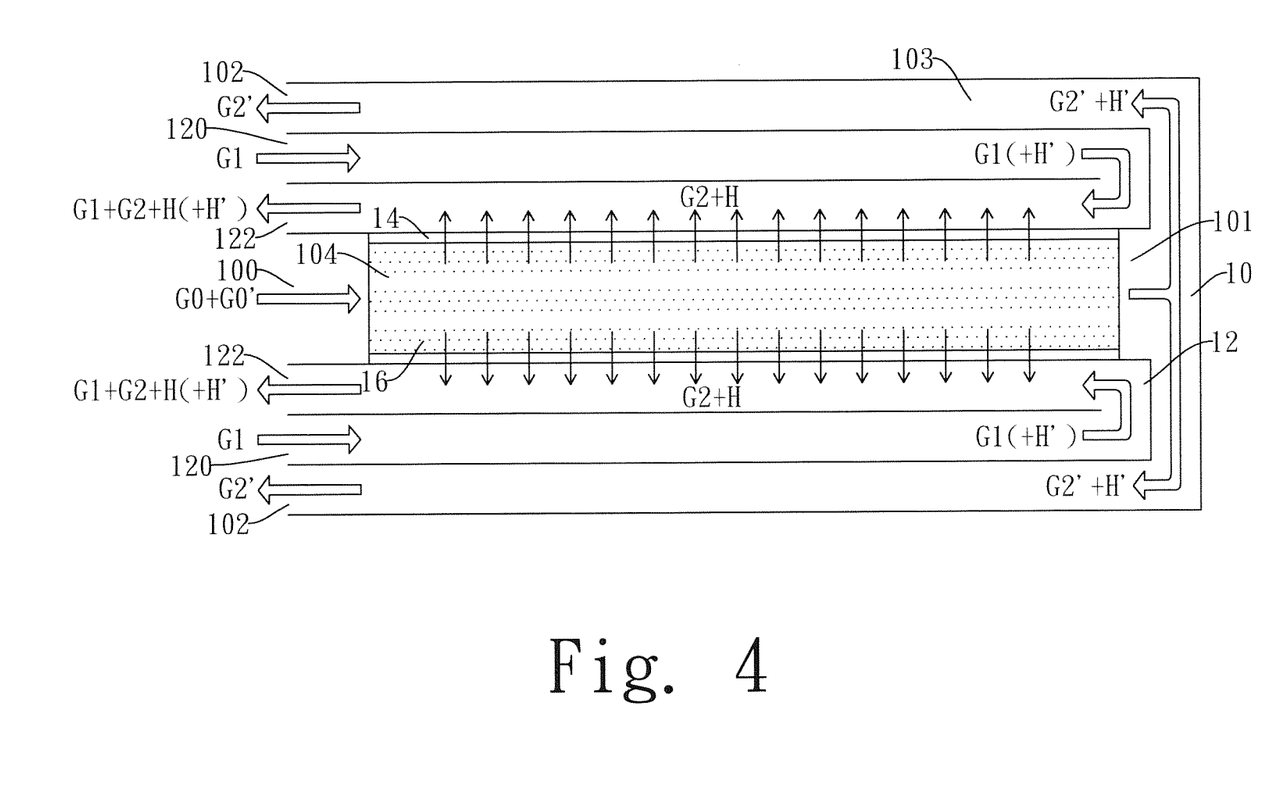
FIG. 4 is a sectional structural view of fourth embodiment of the membrane reactor of the present invention.

FIG. 4 is the sectional structural view of the fourth embodiment of the membrane reactor for recovering the heat of reaction of the present invention. Referring to FIG. 1 and FIG. 4, the membrane reactor for recovering the heat of reaction of this embodiment contains the membrane reactor 1, and the membrane reactor 1 consists of the reaction pipeline 10, the catalytic layer 16 (marked with dots in the figures) installed in the reaction space 104 of the reaction pipeline 10, the membrane 14 formed on the outer wall of the reaction space 104 and the sweep pipeline 12 formed outside the membrane 14. The reaction pipeline 10 located downstream the reaction space 104 is extended to enclose the outer wall of the sweep pipeline 12.

The characteristic of this embodiment is the configuration that the sweep pipeline 12 is arranged outside the front (upstream) segment 101 of the reaction pipeline 10 (including the reaction space 104) and folded up to reverse the flow direction of the sweeping gas. The reaction pipeline 10 is extended further downstream as the rear segment 103 of and wraps around the sweep pipeline 12, with the flow direction in counter-current orientation. The reaction gas inlet 100 is surrounded by the sweeping gas outlet 122, while the sweeping gas inlet 122 resides between the sweeping gas outlet 122 and the reaction gas outlet 102, so that the heat energy generated from the reaction pipeline 10 can be transferred to the sweeping gas more completely.

Referring to this figure, the sweeping gas G1 enters the sweep pipeline 12 from the sweeping gas inlet 120, and then contacts with the downstream end of the reaction pipeline 10 and receives the residual heat H' carried by the product gas G2'. The sweeping gas G1 passes through the fold-up part of sweep pipeline 12 and get in contact with the membrane 14, then carries away the product gas G2 and the heat of reaction H and is discharged from the sweeping gas outlet 122. Furthermore, the place of the sweeping gas inlet 120 and sweeping gas outlet 122 of this embodiment are exchangeable, so that the sweeping gas G1 contacts with the membrane 14 first to carry away the product gas G2 and the heat of reaction H when the sweeping gas G1 enters the sweep pipeline 12, and then the sweeping gas G1 passes through the fold-up part of sweep pipeline 12, contacts with the rear segment 103 of the reaction pipeline 10 and receives the residual heat H' carried by the product gas G2'. By this arrangement, the flow direction of the sweeping gas is in co-flow orientation with the flow direction of the reactant gas G0 and G0 and the product gas G2'.

In this embodiment, the sweep pipeline 12 is extended and folded up to increase the area of the sweep pipeline 12 contacting with the reaction pipeline 10 and the time for the sweeping gas G1 to receive the heat of reaction H and the residual heat H' is elongated, thus a better effect of recovering heat can be achieved.

Figure 5:
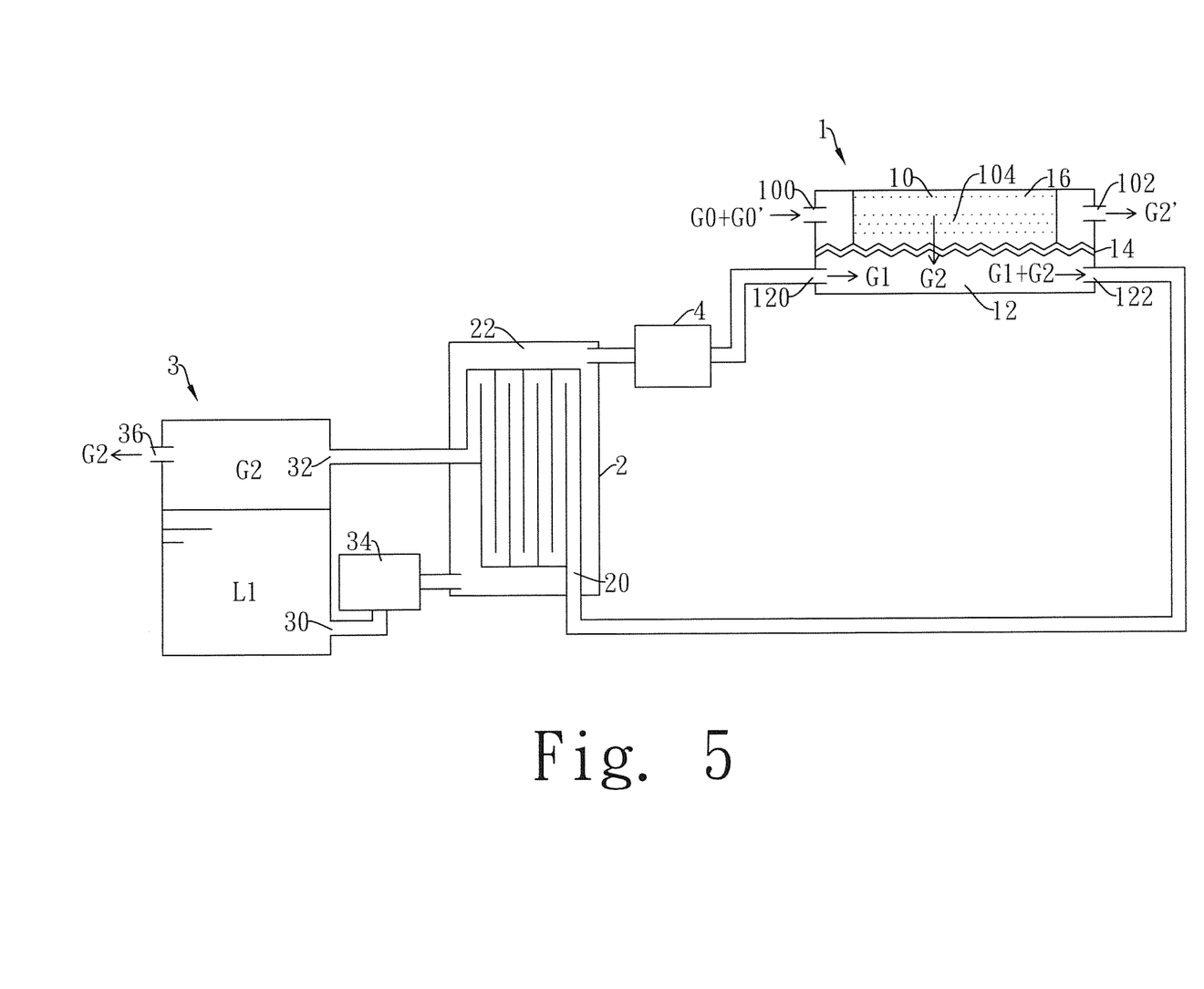
FIG. 5 is a connection diagram of fifth embodiment of the membrane reaction apparatus of the present invention.

FIG. 5 is a connection diagram of the fifth embodiment of the membrane reactor of the present invention. Referring to FIG. 5, a heat exchanger 2 and a liquid tank 3 are further formed outside the membrane reactor 1. The heat exchanger 2 comprises a heat-discharging pipeline 20 and a heat-charging pipeline 22, while the endothermic pipeline 22 contacts with the exothermic pipeline 20. An outlet 30 of the liquid tank 3 is connected to the heat exchanger 2, a heater 4, and the sweeping gas inlet 120 formed in the front end of the sweep pipeline 12. The sweeping gas outlet 122 formed in the downstream end of the sweep pipeline 12 is connected to the heat-discharging pipeline 20, and the downstream end of heat-discharging pipeline 20 is connected to an inlet 32 of the liquid tank 3.

The heat of reaction is involved in a process of heating the condensed liquid L1 to form the sweeping gas G1. The liquid discharged from the outlet 30 of the liquid tank 3 passes through a pump 34 and connects to the heat-charging pipeline, whereby the heat energy released from the heat-discharging pipeline can be used in the heater 4 to heat the condensed liquid L1 or the sweeping gas G1.

After the sweeping gas G1 carrying the product gas G2 and the heat of reaction flows out of the sweep pipeline 12, the sweeping gas G1 flows into the heat-discharging pipeline 20 in the heat exchanger 2, releases the heat of reaction in the heat-discharging pipeline and condenses to form the condensed liquid L1. After the condensed liquid L1 and the product gas G2 is discharged from the heat-discharging pipeline 20, the condensed liquid L1 and the product gas G2 flows into the liquid tank 3 through an inlet 32 of the liquid tank 3. The condensed liquid L1 and the product gas G2 can be separated easily due to the immiscibility of the condensed liquid with the product gas G2. The product gas escapes from the air outlet 36 of the liquid tank 3 to obtain the product gas G2 with high purity.

In the embodiment, the condensed liquid L1 in the liquid tank 3 is pumped by the pump 34 and heated by the heat-charging pipeline 22 and the heater 4 to form the sweeping gas G1. After the sweeping gas G1 enters the sweep pipeline 12 and carries away the product gas G2 and the heat of reaction, the sweeping gas G1 releases the heat of reaction in the heat-discharging pipeline 20 and condenses to form the condensed liquid L1. Accordingly, the condensed liquid L1 and the sweeping gas G1 is recyclable and reusable. Heat energy can be integrated by the process of condensing the sweeping gas G1 and the process of evaporating condensed liquid L1. Therefore, the sweeping gas G1 can be condensed into the condensed liquid L1 and separated from the product gas G2 while the sweeping gas G1 with higher condensation temperature is selected. Sweeping gas G1 with higher specific heat can be selected to carry more heat energy, so that the sweeping gas G1 provides better effects to improve the temperature distribution on the membrane 14, and carries the heat of reaction easily to be transported into other heat-charging processes through heat exchange.

The heat of reaction released from the sweeping gas G1 in the heat-discharging pipeline 20 is used for heating the condensed liquid L1, which is evaporated to form the sweeping gas G1 repeatedly. Furthermore, the heat of reaction recovered by the sweeping gas G1 can be involved into other endothermic processes, for example, heating the reaction substance such as reactant gas G0 and G0' to raise the temperature of the reaction substance to be in the range of reaction. Otherwise, the heat of reaction recovered by the sweeping gas G1 can be involving the synthesis processes of the reactant gas G0 and G0'. According to the water-gas shift reaction of the present invention, CO and $H_2O$ vapor used as reactant gases is generated from the steam reforming of alkenes or reaction of carbonaceous material, an oxidizing agent or water vapor. The-aforementioned reactions are endothermic reaction, and a part of the heat required can be provided by the heat of reaction which the sweeping gas G1 recovers of the present invention.

With the heat exchanger 2 and the liquid tank 3 provided in the present invention, the sweeping gas G1 and the product gas G2 escape from the sweep pipeline 12, flow into an heat-discharging pipeline 20 in the heat exchanger 2 and enter the liquid tank 3 finally. The sweeping gas G1 releases the heat of reaction, whereby the sweeping gas G1 is condensed to form the condensed liquid L1. The condensed liquid L1 and the product gas G2 move to the liquid tank 3 and separated mutually, so that product gas G2 is collected with high purity. The heat of reaction is available to heat substances in an heat-charging pipeline, thus provides the heat of reaction recoverable and reusable.

The heat of reaction recovered in the present invention can be involved to other endothermic processes, and the mixture of the sweeping gas G1 and the product gas G2 can be used other reactions directly. The product gas G2 can be further separated from the sweeping gas G1 to collect the product gas G2 with higher purity. If the product gas G2 is fuel gas and the like, such as hydrogen, the product gas G2 is available to be gathered and used as fuel, even be used in fuel cells. Therefore, the present invention can be assembled and installed with a fuel cell to generate fuel gas which the anticathode of the fuel cell requires. The fuel gas is capable to generate electric power via electrochemical conversion.

In summary, the present invention provides a membrane reaction apparatus for recovering heat of reaction, which includes a membrane reactor. The membrane reactor includes a reaction pipeline, a membrane and a sweep pipeline. The reaction pipeline contains a reaction space, wherein an exothermic reaction occurs. Product gas and heat of reaction are generated by the exothermic reaction. The product gas is formed in the reaction space and selectively passes through the membrane to enter the sweep pipeline. Sweeping gas enters the sweep pipeline and carries the product gas and the heat of reaction away. The heat of reaction brought by the sweeping gas can be further released in a heat exchanger, so that the heat of reaction is available to be recovered and used in other endothermic processes. Otherwise, the product gas and the sweeping gas can be further separated and collected respectively. Alternatively, the mixture of the sweeping gas and the product gas can be directly used for involving other reactions.

What is claimed is:

1. A membrane reaction apparatus for recovering heat of reaction comprising:
    a membrane reactor comprising:
        a reaction pipeline, which comprises a reaction space for exothermic reaction therein;
        a membrane installed in the reaction pipeline and encloses at least a part of the reaction space, and both ends of the membrane connected with the reaction pipeline, wherein product gas and heat of reaction generated from the exothermic reaction pass through or are accumulated by the membrane; and
        a sweep pipeline, wherein one side of the sweep pipeline is installed in outer side of the membrane, and sweeping gas enters into the sweep pipeline and contacts with the membrane, then carries away the product gas and the heat of reaction;
    wherein the reaction pipeline is extended to completely enclose the other side of the sweep pipeline, whereby the sweeping gas receives residual heat in the extending part of the reaction pipeline.

2. The membrane reaction apparatus for recovering heat of reaction as claimed in claim 1, wherein the reaction space further comprises a catalytic layer with multiple pores therein for catalyzing the exothermic reaction, and the product gas is generated by catalysis of the catalytic layer and passes through the pores and penetrates the membrane.

3. The membrane reaction apparatus for recovering heat of reaction as claimed in claim 1, wherein the sweep pipeline contacts with the reaction pipeline and the sweeping gas flowing along the sweep pipeline receives residual heat in the reaction pipeline.

4. The membrane reaction apparatus for recovering heat of reaction as claimed in claim 1, which further comprises a heat exchanger having: a heat-discharging pipeline connected with the outlet of the sweep pipeline, and the sweeping gas releases the heat of reaction to the heat-discharging pipeline; and a heat-charging pipeline in contact with the heat-discharging pipeline for receiving the heat of reaction released from the sweeping gas.

5. The membrane reaction apparatus for recovering heat of reaction as claimed in claim 4, which further comprises a liquid tank connected with the outlet of the heat-discharging pipeline, and the liquid tank is capable to collect the condensed liquid which the sweeping gas forms, whereby the product gas is separated from the condensed liquid.

6. The membrane reaction apparatus for recovering heat of reaction as claimed in claim 5, wherein the liquid tank is connected with the inlet of the heat-charging pipeline, in which the condensed liquid or another material receives the heat of reaction released from the sweeping gas in the heat-discharging pipeline.

7. The membrane reaction apparatus for recovering heat of reaction as claimed in claim 1, wherein the exothermic reaction is a water-gas shift reaction.

8. The membrane reaction apparatus for recovering the heat of reaction as claimed in claim 7, wherein the membrane is a palladium membrane or a palladium alloy membrane.

* * * * *